United States Patent Office 3,211,748
Patented Oct. 12, 1965

3,211,748
BENZDITHIYLIUM SALTS, AND PROCESS FOR THEIR MANUFACTURE
Robert Wizinger and Louis Soder, both of Basel, Switzerland, assignors to Ciba Corporation, a corporation of Delaware
No Drawing. Filed May 10, 1961, Ser. No. 108,981
Claims priority, application Switzerland, Mar. 14, 1958, 57,049/58
2 Claims. (Cl. 260—327)

This is a continuation in part of our copending application Serial No. 799,434, filed March 16, 1959 (now abandoned).

The present invention relates to 1:3-dithiahydrindenylium salts. In the cations of the 1:3-dithiahydrindenylium salts mesomerism occurs according to the following formula

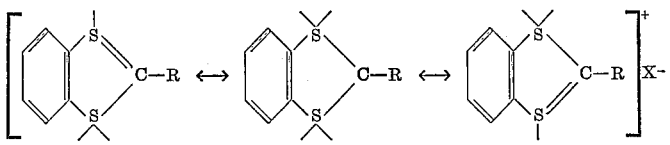

For the sake of simplicity only the carbenium formula without the electron symbols will be used hereinafter. In the place of the somewhat clumsy but correct nomenclature, 1:3-dithiahydrinhenylium salts, we shall use the trivial name benzdithiylium salts.

The invention more especially relates to compounds of the structure

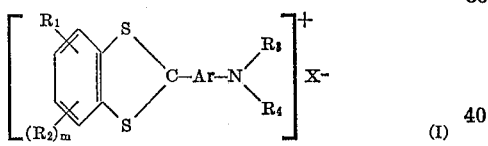

wherein Ar stands for an arylene radical, $R_1$ and $R_2$ stand for hydrogen, lower alkyl, hydroxy, substituted hydroxy or halogeno-lower alkyl and $m$ stands for an integer smaller than 4. $R_3$ and $R_4$ which may be the same or different stand for hydrogen or aliphatic hydrocarbon radicals, preferably alkyl radicals such as lower alkyl radicals, e.g., methyl, ethyl, straight-chain or branched propyl, butyl or pentyl, $R_3$ and $R_4$ together may also form an alkyleneimino ring which also may be interrupted by heteroatoms, such as oxygen, nitrogen and sulfur. Therefore the amino group may represent, e.g., a free amino group a mono- or dilower alkylamino group, such as methylamino, propylamino, butylamino, dimethylamino, diethylamino, dipropylamino, piperidino, morpholino, 3-thia-pentamethyleneimino, piperazino- and N-methyl piperazino groups.

The arylene radical is at most binuclear, e.g., a naphthylene or phenylene radical. The arylene radical may be substituted by the substituents mentioned for $R_1$, substituents at the aromatic radicals are, therefore, radicals, such as those mentioned above, or free or substituted hydroxyl groups, for example, hydroxyl substituted by lower aliphatic hydrocarbon radicals, more especially by lower alkyl radicals such as those mentioned above, or halogen atoms such as chlorine and bromine atoms, or halogeno-lower alkyl such as trifluoromethyl.

The anion is preferably an anion of a therapeutically useful acid. As acids there may be mentioned inorganic and organic acids, for example, hydrohalic acids, sulfuric acid, phosphoric acid, nitric acid, perchloric acid; aliphatic, alicyclic, aromatic or heterocyclic carboxylic acids, such as formic, acetic, propionic, oxalic, succinic, glycollic, lactic, malic, tartaric, citric, ascorbic, hydroxymaleic, dihydroxymaleic or pyroracemic acid; phenyl acetic, benzoic, p-aminobenzoic, anthranilic, p-hydroxybenzoic, salicylic acid or p-aminosalicylic acid; methane sulfonic, ethane sulfonic, hydroxyethane sulfonic or ethylene sulfonic acid; toluene sulfonic or naphthalene sulfonic acids or sulphanilic acid.

The new benzdithiylium salts exert a high action against certain types of worms, e.g., nematodes existing in the intestine and tissues, such as oxyuris, strongyloides, ancylostoma and larvae of filaria; and accordingly can be used for treating diseases caused by worms, particularly those named above.

Especially valuable are the compounds of the formula

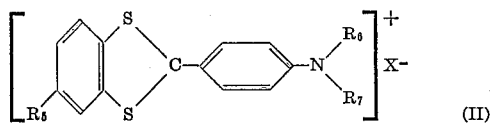

wherein $R_5$, $R_6$ and $R_7$ stand for lower alkyl radicals and $R_5$ may also represent hydrogen, and $X^-$ has the meaning given above.

Special mention deserves the 2-(p-dimethylaminophenyl-5-methyl-benzdithiylium salts of the formula

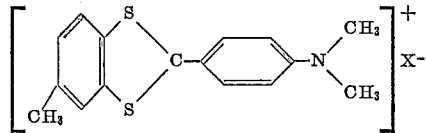

wherein $X^-$ has the meaning given above.

Another embodiment of the invention are the benzdithiylium salts of the structure

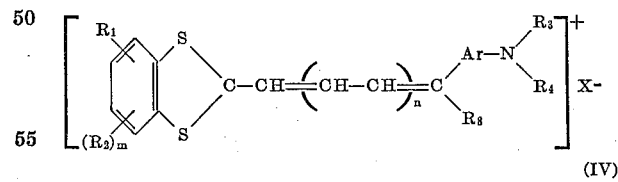

wherein —Ar—, $R_1$, $R_2$, $R_3$, $R_4$, $m$ and $X^-$ have the meanings given above, $n$ stands for an integer from 0 to 1 and $R_8$ has the same meaning as

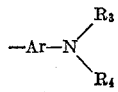

or represents hydrogen.

These benzdithiylium salts also exert a high lethal action against certain types of worms, e.g., nematodes, such as the larvae of filaria and, accordingly, can be used for treating diseases caused by nematodes, such as for instance filariasis in humans.

They are also to be used as basic dyestuffs, particularly for the dyeing of artificial fibers, especially when great brilliancy of tint is required.

Special mention deserve the salts of the formula

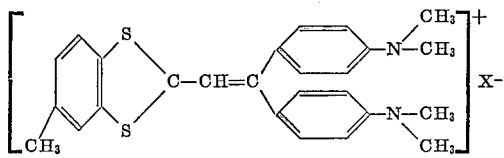

where $X^-$ has the meaning given above.

A further embodiment of the invention are the benzdithiylium salts of the structure

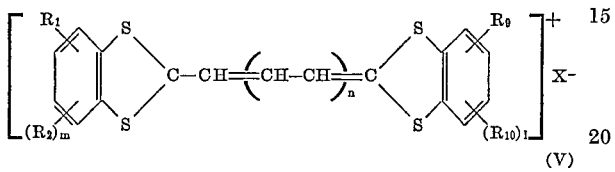

(V)

wherein $R_1$, $R_2$, $m$, $X^-$ and $n$ have the meanings given above and $R_9$ $l$ and $R_{10}$ which may be the same as $R_1$, $m$ and $R_2$, respectively or if $n$ is 0 may be different, may have the meanings given above for $R_1$, $R_2$ and $m$.

These compounds also exert a high lethal action against certain types of worms, e.g., nematodes, such as the larvae of filaria and, accordingly, can be used for treating diseases caused by nematodes, such as, for instance, filarisis in humans.

They are also to be used as basic dyestuffs, particularly for the dyeing of artificial fibers, especially when great brilliancy of tint is required. The dyestuffs of the type of the merocyanines can be used as pigments or for dyeing fats, oils, varnishes and plastic masses. In addition they are intended for photographic use.

The new benzdithiylium salts may be prepared by new and surprising methods. They can very easily be prepared by condensing an aryl-o-dithiol with a corresponding carboxylic acid or its functional derivatives in the presence of acid condensing agents such as $POCl_3$ or organic and inorganic acids, e.g., such as those listed above. Functional derivatives of acids are, e.g., acid chlorides or anhydrides. It could by no means be foreseen with certainty that the formation of the salts from aromatic carboxylic acids would take place so easily. Quite unexpected, though, was the finding that the formation of benzdithiylium salts takes place extremely readily even with aliphatic carboxylic acids.

Thus, the new salts of Formula I may be prepared by condensing an aryl-o-dithiol of the formula

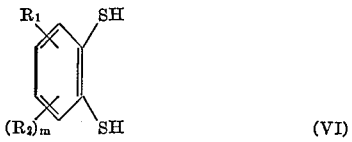

(VI)

wherein $R_1$, $R_2$ and $m$ have the meaning above, with a carboxylic acid of the formula

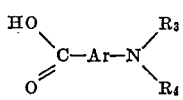

wherein —Ar—, $R_3$ and $R_4$ have the meanings given above, or its functional derivatives.

Similarly the salts of the Formula IV may be prepared by condensing an aryl-1-dithiol of the Formula VI, wherein $R_1$ and $R_2$ and $m$ have the meanings given above with an acid of the formula

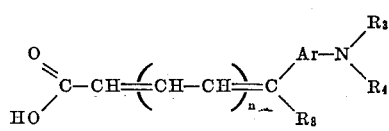

wherein $n$, Ar, $R_3$, $R_4$ and $R_8$ have the meanings given above or its functional derivatives.

The salts of the Formula V, wherein $R_1$ and $R_9$, $R_2$ and $R_{10}$ and $m$ and $l$ have the same meaning, finally, may be prepared in an analogous manner by condensing a dicarboxylic acid of the formula $$HOOC-CH_2(CH=CH)_nCOOH$$

wherein $n$ has the meaning given above, or its functional derivatives with an aryl-o-dithiol of the Formula VI.

Another new method for preparing the benzdithiylium salts of Formula I wherein the group

is in the para-position consists in condensing a salt of the formula

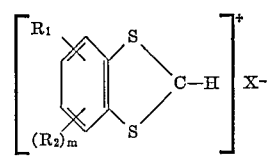

(VII)

wherein $R_1$, $R_2$, $m$ and $X^-$ have the meanings given above, with a compound of the formula

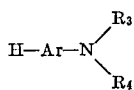

wherein —Ar—, $R_3$ and $R_4$ have the meanings given above. This condensation takes places very readily with the formation of leuco substances which undergo dehydrogenation and thus pass over into the benzdithiylium salts. These reactions have a very rapid course in a solution of glacial acetic acid. In some cases the addition of sodium acetate, possibly also of acetic acid anhydride, has proved useful. The reaction runs very rapidly with primary, secondary and tertiary aromatic amines. From the point of view of procedure this process is an improvement since the preparation of the corresponding aromatic p-aminocarboxylic acids, some of which are not easily accessible or even not yet known, can be dispensed with.

Another method for preparing the benzdithiylium salts of the Formula IV consists in condensing a salt of the formula

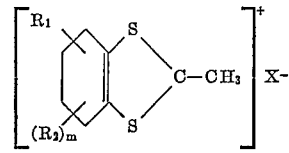

(VIII)

wherein $R_1$, $R_2$, $m$ and $X^-$ have the meanings given above, with an oxo-compound of the formula

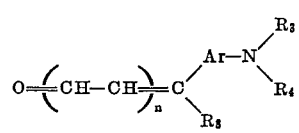

wherein $n$, Ar, $R_3$, $R_4$ and $R_8$ have the meanings given above.

An easy method for preparing the salts of the formula

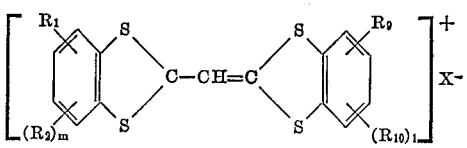

wherein $R_1$, $R_2$, $R_9$, $R_{10}$, $m$, $l$ and $X^-$ have the meanings given above consists in condensing a salt of the formula

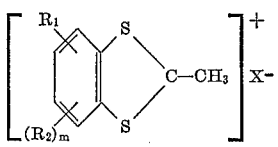

with a salt of the formula

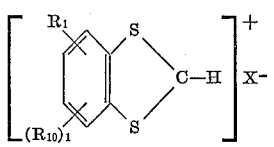

in which formulae $R_1$, $R_2$, $R_9$, $R_{10}$, $m$, $l$ and $X$ have the meanings given above.

The said reactions are carried out preferably in the presence of a diluent and a condensing agent at the ordinary or an elevated temperature.

Depending on the condensing agents used, the salts of the respective acids are obtained, e.g., the abovementioned ones.

The compounds of the formulae

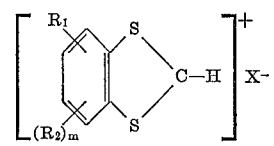

and

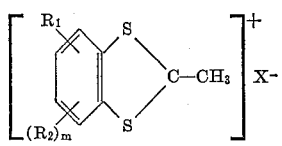

wherein $R_1$, $R_2$, $m$ and $X^-$ have the meanings given above, which are used as starting materials can be prepared by the condensation of an aryl-o-dithiol of the formula

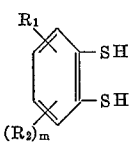

with formic or acetic acid respectively. They also show a high lethal action against nematodes. The other starting materials are known or may be prepared by known methods.

The new benzdithiylium salts may be used as medicaments in human and veterinary medicine in the form of pharmaceutical preparations. These contain the specified compounds in admixture with a pharmaceutical organic or inorganic carrier material suitable for enteral or parenteral administration. As such are concerned substances that do not react with the described compounds, for example water, gelatine, lactose, petroleum, jelly, starch, magnesium stearate, talc, vegetable oils, benzyl alcohols, gums, polyalkylene glycols, cholesterol or other known medicament carriers. The pharmaceutical preparations can be made up, for example, as tablets or dragées, or in liquid form as solutions, suspensions or emulsions. If desired they are sterilized and/or contain auxiliary substances such as preserving, stabilizing, wetting or emulsifying agents. They can also contain other therapeutically valuable substances. The preparations are prepared by customary methods.

The following examples illustrate the invention.

*Example 1*

3.2 grams of toluene-dithiol and 3.6 grams of dimethylaminobenzoic acid are heated in 40 cc. of phosphorus oxychloride for 3 minutes until the mixture begins to boil. The deep carmine red mixture is poured into 400 cc. of water. The benzdithiylium salt separates off in fine dispersion. It is filtered off and dissolved in cold water (about 1:1). The solution is heated to about 90° C., and 125 grams of solid sodium chloride are added. Heating is continued until the salt is dissolved. On cooling, the benzdithiylium salt precipitates in the form of small dark red crystals. The product dissolves in water with a carmine red color ($\lambda$ max 536 m$\mu$). The salt has the constitution

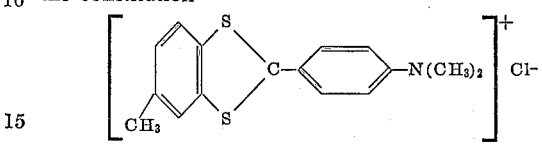

and is distinguished by a high lethal action against nematodes.

*Example 2*

Equivalent quantities of 5-methylbenzdithiylium perchlorate and dimethylaniline are dissolved in hot glacial acetic acid and the whole boiled under reflux for about ½ hour. On cooling, the benzdithiylium salt separates in the form of black red needles having a metallic lustre. The product is the perchlorate of the product described in Example 1.

The 5-methylbenzdithiylium perchlorate used as starting material can be prepared as follows:

1.6 grams of toluene-dithiol are heated with 20 cc. of formic acid of 98% strength to the boil. 1 cc. of perchloric acid of 70% strength is added dropwise and the whole boiled for a short time. Even while it is cooling, part of the 5-methylbenzdithiylium perchlorate separates. Separation is completed by adding three times its volume of ether. The precipitate is suction-filtered and rinsed with ether. The crude product is already very pure and forms very faintly pale pink colored crystals. The pale pink colored crude product is almost analytically pure. By recrystallization from glacial acetic acid colorless crystals are obtained which deflagrate at about 165° C. The product is preferably kept in dark bottles. Yield: 80 to 90%. It corresponds to the formula

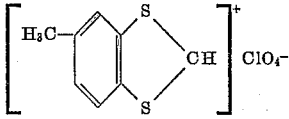

and is distinguished by a lethal action against nematodes.

*Example 3*

280 mg. of 2:5-dimethylbenzdithiylium perchlorate and 170 mg. of dimethylaminobenzaldehyde are heated at the boil in 15 cc. of glacial acetic acid. The solution immediately becomes deep blue, and in a few minutes the condensation is complete. On cooling, the benzdithiylium salt crystallizes in the form of needles having a green metallic lustre. Melting point: 205° C. (with decomposition). The salt dissolves in alcohol or glacial acetic acid to form a deep blue color ($\lambda$ max 644 m$\mu$). Its constitution corresponds to the formula

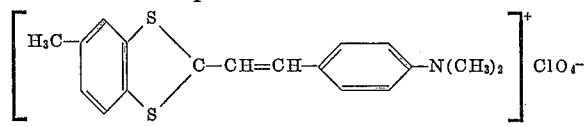

and it is distinguished by a lethal action against nematodes.

In an analogous manner the benzdithiylium salt of the formula

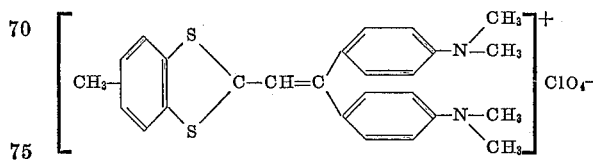

may be prepared from 2:5-dimethylbenzdithiylium perchlorate and Michler's ketone.

The 2:5-dimethylbenzdithiylium perchlorate used as starting material can be prepared as follows:

1.6 grams of toluene-dithiol are heated under reflux with 8 cc. of glacial acetic acid and 2 cc. of perchloric acid of 70% strength until a homogeneous solution is formed, which is the case after about 30 minutes. On cooling, part of the condensation product crystallizes out. By adding double the volume of ether, precipitation is completed. After filtering and rinsing with ether, 2:5-dimethyl-benzdithiylium perchlorate is obtained in the form of white crystals with a silky lustre melting at 170–172° C. (with decomposition). The product has

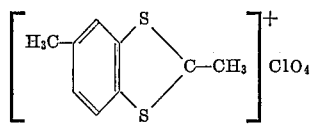

and is distinguished by a lethal action against nematodes.

Example 4

320 mg. of toluene-dithiol and 200 mg. of malonic acid are heated with 5 cc. of phosphorus oxychloride for 5 minutes at the boil. The deep blue red mixture is introduced into 20 cc. of glacial acetic acid. On adding 1 cc. of perchloric acid of 70% strength the benzdithiylium salt precipitates in crystalline form. After recrystallization from glacial acetic acid it forms red lustrous needles. Decomposing point: about 265° C. The benzdithiylium salt dissolves in alcohol or glacial acetic acid to form a deep red color ($\lambda$max 514 m$\mu$). The product is the symmetrical benzdithiylium-monomethine of the following constitution

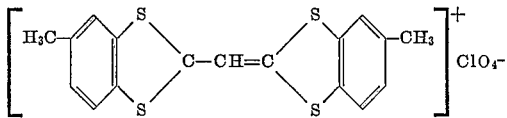

and is distinguished by a lethal action against nematodes.

Example 5

320 mg. of toluene-dithiol and 130 mg. of glutaconic acid are heated in 5 cc. of phosphorus oxychloride for 5 minutes at the boil. The deep blue solution is poured into a mixture of 20 cc. of glacial acetic acid and 5 cc. of water. After completing the decomposition of the phosphorus oxychloride, the perchlorate is precipitated with perchloric acid. After recrystallization from glacial acetic acid it is obtained in the form of needles having a green metallic lustre which dissolve in alcohol or glacial acetic acid with a pure, deep blue color. ($\lambda$max 666 m$\mu$.) Decomposing point: about 265° C.

The compound is the symmetrical trimethine of the benzdithiylium series

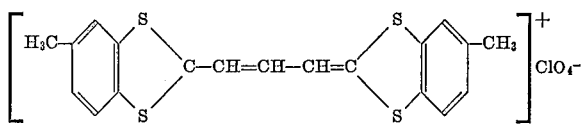

and is distinguished by a lethal action against nematodes.

What is claimed is:

1. A compound of the formula

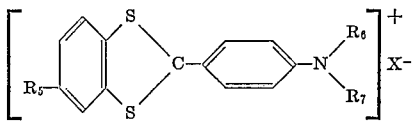

wherein $R_5$, $R_6$ and $R_7$ each stands for lower alkyl, and $X^-$ represents the anion of a therapeutically useful acid.

2. A compound of the formula

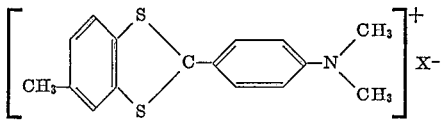

wherein $X^-$ represents the anion of a therapeutically useful acid.

References Cited by the Examiner

UNITED STATES PATENTS

| | | | |
|---|---|---|---|
| 2,734,901 | 2/56 | Belcher | 260—240.9 |
| 2,776,280 | 1/57 | Brooker et al. | 260—240.6 |
| 2,816,116 | 12/57 | Fields | 260—327 |

OTHER REFERENCES

Clark, Aanalyst, volume 82, pages 182–185 (1957).

Hurtley et al., Journ. of the Chem. Soc. (1926), pp. 1821–8.

Hurtley et al., Journ. of the Chem Soc. (1926), pages 2263–2270.

Hurtley et al., Journ. of the Chem. Soc. (1927), pages 534–7.

Neblette, Photography, 4th Ed., page 348, Van Nostrand and Company (1943).

Neunhoeffer et al., Naturwissenschaften, volume 45, pages 491–2, (November 1958).

Wizinger et al., Chimia, volume 12, pages 79 to 81, March 15, 1958.

WALTER A. MODANCE, *Primary Examiner.*

IRVING MARCUS, JOHN D. RANDOLPH,
*Examiners.*